(12) United States Patent
Neary

(10) Patent No.: US 8,171,347 B2
(45) Date of Patent: May 1, 2012

(54) METHOD AND APPARATUS FOR TROUBLESHOOTING A COMPUTER SYSTEM

(75) Inventor: Paul P. Neary, Greystones (IE)

(73) Assignee: Oracle America, Inc., Redwood Shores, CA (US)

( * ) Notice: Subject to any disclaimer, the term of this patent is extended or adjusted under 35 U.S.C. 154(b) by 335 days.

(21) Appl. No.: 11/776,147

(22) Filed: Jul. 11, 2007

(65) Prior Publication Data

US 2009/0019320 A1   Jan. 15, 2009

(51) Int. Cl.
*G06F 11/00* (2006.01)

(52) U.S. Cl. ............... 714/47.1; 10/11; 10/25; 10/48
(58) Field of Classification Search ............ 714/1–57; 702/186; 371/23
See application file for complete search history.

(56) References Cited

U.S. PATENT DOCUMENTS

| | | | | |
|---|---|---|---|---|
| 4,727,545 | A * | 2/1988 | Glackemeyer et al. | 714/33 |
| 6,226,760 | B1 * | 5/2001 | Burkhardt et al. | 714/33 |
| 6,934,878 | B2 * | 8/2005 | Massa et al. | 714/5 |
| 7,222,262 | B2 * | 5/2007 | Prasadh et al. | 714/31 |
| 7,493,527 | B2 * | 2/2009 | Garza et al. | 714/48 |
| 2002/0091753 | A1 * | 7/2002 | Reddy et al. | 709/202 |
| 2005/0081124 | A1 * | 4/2005 | Luick | 714/56 |
| 2005/0188268 | A1 * | 8/2005 | Verbowski et al. | 714/37 |
| 2005/0223285 | A1 * | 10/2005 | Faihe et al. | 714/25 |
| 2005/0273656 | A1 * | 12/2005 | Adkisson et al. | 714/25 |
| 2006/0007491 | A1 * | 1/2006 | Kanda et al. | 358/1.16 |
| 2006/0149992 | A1 * | 7/2006 | Shima | 714/4 |
| 2006/0168475 | A1 * | 7/2006 | Segers et al. | 714/25 |
| 2007/0300103 | A1 * | 12/2007 | Verbowski et al. | 714/37 |
| 2008/0201609 | A1 * | 8/2008 | Lu et al. | 714/27 |

* cited by examiner

*Primary Examiner* — Scott Baderman
*Assistant Examiner* — Sarai Butler
(74) *Attorney, Agent, or Firm* — Park, Vaughan, Fleming & Dowler LLP

(57) ABSTRACT

One embodiment of the present invention provides a system for troubleshooting a computer system. During operation, the system receives an identifier for a suspect computer system, which is suspected of operating abnormally. The system also receives an identifier for a normal computer system, which is operating normally. Next, the system automatically sends a command to be executed to both the suspect computer system and to the normal computer system. The system subsequently receives a response to the command from both the suspect computer system and the normal computer system and compares the responses to determine differences in behavior between the suspect computer system and the normal computer system.

21 Claims, 5 Drawing Sheets

METHOD AND APPARATUS FOR TROUBLESHOOTING A COMPUTER SYSTEM

BACKGROUND

1. Field of the Invention

The present invention relates to computer systems. More specifically, the present invention relates to a method and apparatus for troubleshooting a computer system.

2. Related Art

Quality assurance (QA) and information technology (IT) professionals typically perform a large number of tests to confirm that a computer system is functioning properly. A common approach to troubleshooting a system is to utilize diagnostic software, which probes for information by interacting with the system or by automatically collecting output for analysis. In either case, diagnostic analysis can be simple or sophisticated. It may also be ad hoc or premeditated.

However, it is often difficult to use diagnostic software to detect aberrant behavior. One approach is to perform a baseline comparison by comparing diagnostic output with nominal output. The nominal output can be produced either from a similar system to the system under test, or from a log of historical data from the system under test that was generated during a prior period of normal operation. However, this type of log is often not sufficient for testing purposes because it is difficult to anticipate what information will be required to determine that the computer system is operating properly.

When the baseline log is not sufficient for testing purposes, a QA or an IT professional may attempt to perform ad hoc troubleshooting by comparing the results of a set of actions performed on multiple computer systems. With ad hoc troubleshooting (where personnel interact with the system in an unpremeditated and explorative manner), having access to another (identical or similar) system on which to make comparisons facilitates determining if specific behavior is abnormal. However, one problem with this approach is that to make a meaningful comparison a user needs to replicate explorative probing of the system under test on a baseline system. This can be both time-consuming and tedious, and comparative analysis in these cases is very error prone.

Nevertheless, in many cases when a user troubleshoots a software installation, it is necessary for the user to perform some ad hoc and explorative analysis. Frequently, an experienced systems expert may spend a lot of time engaged in ad hoc and explorative analysis during system service or deployment. Often, a lack of known baseline behavior with which to make comparisons exacerbates the problem of identifying aberrant system behavior in an ad hoc and explorative setting. Furthermore, because the ad hoc troubleshooting is explorative, the diagnostic information it produces tends to be unpredictable and varied (it depends on the situation and the response of the system expert to the challenge at hand). Therefore, there is generally no a priori set of nominal behaviors/responses available for a baseline comparison (other than the user's innate ability to sense unusual behavior).

Hence, what is needed is a method and apparatus for troubleshooting a computer system without the problems listed above.

SUMMARY

One embodiment of the present invention provides a system for troubleshooting a computer system. During operation, the system receives an identifier for a suspect computer system, which is suspected of operating abnormally. The system also receives an identifier for a normal computer system, which is operating normally. Next, the system automatically sends a command to be executed to both the suspect computer system and to the normal computer system. The system subsequently receives a response to the command from both the suspect computer system and the normal computer system and compares the responses to determine differences in behavior between the suspect computer system and the normal computer system.

In a variation on this embodiment, the system receives an identifier for an additional normal computer system, which is operating normally. Next, the system sends the command to the additional normal computer system to cause the additional normal computer system to execute the command. The system subsequently receives a response to the command from the additional normal computer system. The system then compares the responses from the suspect computer system, the normal computer system, and the additional normal computer system to determine differences in behavior between the computer systems.

In a variation on this embodiment, the command includes a plurality of commands. Note that the system can execute the plurality of commands on a plurality of computer systems.

In a variation on this embodiment, the system receives the command from a client.

In a variation on this embodiment, the system additionally uses a filter to filter out negligible differences between the responses and presents the filtered differences to a client.

In a variation on this embodiment, comparing the responses involves ranking the differences between the responses based on the probability that each difference caused the suspect computer system to function abnormally.

In a variation on this embodiment, the differences can be associated with: a hardware malfunction; an operating system malfunction; an application malfunction; and a configuration error. The differences can also be nominal differences, which exist between computer systems during normal operation.

In a variation on this embodiment, after presenting the differences to a client, the system receives from the client a negligible-differences specifier, which specifies negligible differences between responses from computer systems. The system then creates a filter to filter out the negligible differences and stores the filter in a database.

DETAILED DESCRIPTION

Figure 1:
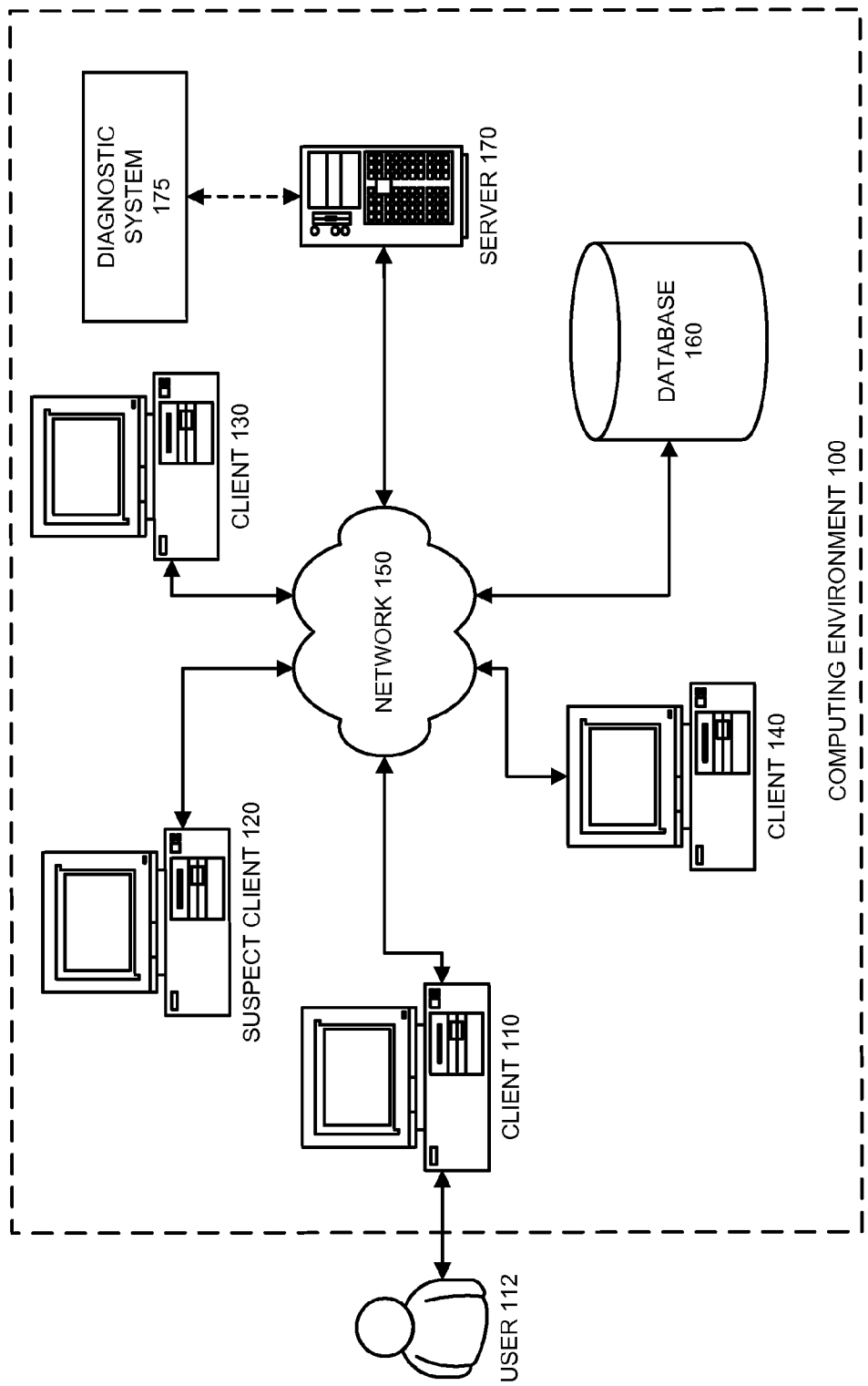
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

One embodiment of the present invention provides a diagnostic system for troubleshooting a computer system. This diagnostic system enables a user to issue a command once, and to select multiple computer systems on which to execute the command. The diagnostic system then automatically executes the command on the multiple computer systems, and in doing so eliminates the possibility of making a mistake while replicating the command across the multiple computer systems. Furthermore, the diagnostic system facilitates rapid detection of abnormal system behavior by facilitating ad hoc comparisons between computer systems to detect anomalous or abnormal behavior. Note that the commands can be executed simultaneously across the multiple computer systems, and can also be executed in real time.

In one embodiment of the present invention, the diagnostic system can execute additional commands: to initiate processes on the multiple computer systems to facilitate the monitoring of responses to subsequent commands; to provide resources for effective execution of these commands; and to provide filtering resources for analysis of the responses to the subsequent commands.

In one embodiment of the present invention, the diagnostic system includes a network-based client/server productivity tool through which a user can remotely operate multiple client systems. This productivity tool enables multiplexing of a single (or multiple) session(s) across multiple systems, which facilitates duplicating actions and commands received from a user across multiple systems.

In one embodiment of the present invention, the diagnostic system can include utilities for comparing responses to commands. In this embodiment, the diagnostic system can compare the responses using: graphical, categorical, structural, and statistical comparisons. In addition, the diagnostic system can perform pattern recognition to facilitate comparing the multiple system outputs. Furthermore, the diagnostic system can initiate utilities for data collection on each system through the execution of additional or "service" commands.

Hence, the present invention can provide a number of advantages. More specifically, the present invention can: provide exact replication of interactive actions across a multitude of computer systems; improve the efficiency of comparing computer system responses to identical inputs; improve the reliability of sending identical inputs to multiple systems; facilitate replicating multiple sessions across multiple computer systems; enable the comparison of different system responses to identical inputs; enable the structural, graphical, and statistical comparisons between multiple computer systems in real-time; and provide an interactive diagnostic tool for use in ad hoc and tentative system troubleshooting scenarios. The following examples illustrate several use cases for such a diagnostic system.

In the first example, a Quality Assurance (QA) engineer desires to perform a lengthy test of a development version of an operating system installation. For comparison purposes, the QA engineer possesses the results from an identical test performed on a similar platform (using a prior stable version of the same operating system). After identifying a regression on the development platform, the QA engineer desires to discover the cause of the failure. Using the diagnostic system, the QA engineer can interactively probe identical aspects of both the test system and the reference system to locate the cause of a problem with the development version of the operating system.

In another example, a professional services engineer is involved in the deployment and activation of a large system installation at a customer site. Because this is a highly customized installation, the engineer's team has access to a reference configuration of both the hardware and software they are deploying. In this example, the engineer detects a failure during deployment of the system at the customer site. To investigate this problem, the engineer can use the diagnostic system to compare the behavior of the customer system with the reference system in a speculative manner.

In a third example, a system administrator has several systems on which to perform the same sequence of tasks. The system administrator is not sure if these tasks can execute on all of the systems successfully because the systems are not homogeneous (they are not identical platforms or installations). Rather than performing the tasks using a program (which would have to be designed in advance and incorporate checks for many possible/anticipated problems), the system administrator can use the diagnostic system to tentatively execute each task in an incremental fashion on each system.

In another example, a tuning expert is investigating a performance problem on a single live system inside a high-performance supercomputing farm. Another (apparently identical) system appears to be performing normally. In this example, the tuning expert can use the diagnostic system to probe for possible differences between the normal system and the under-performing system.

In one embodiment of the present invention, the diagnostic system includes a multiplexer which receives a command from a user and replicates the command. The multiplexer then sends the replicated commands to the multiple computer systems. Then, the multiplexer receives responses to the replicated command from the multiple computer systems, and presents the responses to the user. This embodiment enables a user to compare the responses from the multiple computer systems without manually interacting with each computer system.

In one embodiment of the present invention, the multiplexer modifies the command to match a command-format associated with each computer system. In this embodiment, each computer system may receive a different version of the command.

In one embodiment of the present invention, the multiplexer enables secondary (or "service") commands to be initiated on each computer system. These secondary commands can provide resources and facilitate data-collection on each computer system. For example, suppose a user desires to determine a disk workload on multiple computer systems with the goal of spotting potential disk issues before an actual disk failure occurs. Using the multiplexer, the user can initiate a "service" command on each computer system to facilitate disk input/output statistic collection during a workload phase, which is initiated with a separate command.

In one embodiment of the present invention, the diagnostic system includes a comparator that can receive and analyze the responses to the command from the multiple computer systems. This comparator can determine differences between the responses from the multiple computer systems and can present the differences to the user.

In one embodiment of the present invention, the comparator can perform simple comparisons, such as between output responses or error responses, or complex comparisons, which involve analyzing system-characteristics after the multiple computer systems execute a command. These system characteristics can include: system-load; process-activity; thread-activity; context-switch frequency; memory-usage; and any other system-characteristic that can indicate differences between computer systems.

In one embodiment of the present invention, the comparator can use pattern recognition to provide the user with a visual or a structural comparison of the responses to the command. For example, suppose that for a set of computer systems the number of incoming packets is usually greater than the number of outgoing packets. Furthermore, suppose that a computer system begins receiving fewer packets than the computer system sends. In this example, the comparator may recognize that the pattern of responses to commands sent to the computer system does not match the pattern of responses to commands sent to other computer systems, which may indicate a potential problem with a network interface card (NIC) in the computer system. In this case, the comparator may indicate a potential problem with the NIC by displaying a flashing red bar, which surrounds the seemingly anomalous packets received statistic associated with the computer system.

In one embodiment of the present invention, the comparator can perform statistical comparisons of the responses to the command. For example, the comparator can determine that a computer system is likely to be configured incorrectly based on the response times to commands, or based on the number of received network packets.

In one embodiment of the present invention, a user can use the diagnostic system to interactively probe identical aspects of a suspect computer system (which is operating abnormally) and a computer system (which is operating normally) to determine the cause of the abnormal behavior of the suspect computer system.

In one embodiment of the present invention; a user can use the diagnostic system to execute a command that initiates processes on the multiple computer systems to: interact with future commands; monitor system responses to future commands; create a desired system state to test the computer systems; and create any other environment or process that facilitates testing and analyzing the multiple computer systems, including the suspect computer system.

In one embodiment of the present invention, a user executes a plurality of commands on a set of heterogeneous systems. In this embodiment, the user can use the diagnostic system to execute the commands one at a time. This enables the user to determine if each of the commands execute as anticipated obviating the need to develop a software application to safely check the responses to each command for anticipated and/or unanticipated problems that may occur while executing the same command across multiple computer systems.

In one embodiment of the present invention, the user can use the diagnostic system to compare multiple computer systems which are behaving (or operating) normally. In this embodiment, the user can determine if a specific computer system is not running as efficiently as anticipated. More specifically, the user can use the diagnostic system to determine if a configuration error, a component malfunction, a software malfunction, or any other unanticipated problem is causing the computer system to run less efficiently than the other computer systems. This embodiment facilitates pro-active system maintenance and achieving optimal performance in a computer system or a network of computer systems.

In one embodiment of the present invention, the comparator can suggest a cause and/or a solution for the suspect computer's abnormal behavior. This suggestion can be based on: historical analysis; statistical analysis; user specified causes previously associated with identified differences in responses to the command; and any other basis for suggesting the cause for the suspect computer's abnormal behavior.

In one embodiment of the present invention, the user can train the diagnostic system to identify abnormal behavior by comparing multiple computer systems that are functioning normally.

In one embodiment of the present invention, the diagnostic system can recommend remedies for abnormal behavior based on remedies for previously identified abnormal behavior.

In one embodiment of the present invention, the diagnostic system can include a filter that filters out negligible or nominal differences in the responses to a command before presenting the differences to the user. These negligible or nominal differences can include differences in: computer system names; network activity levels; access times; and any other differences that may not indicate abnormal behavior. Note that nominal differences can be context specific. For example, if a suspect computer system is having a problem with a sound card, a difference in network activity levels between computer systems is a nominal difference that the diagnostic system can filter from the comparison results. However, if the suspect computer system is having a problem with a network interface card (NIC), a difference in network activity levels between computer systems may not be a nominal difference, but may instead indicate a problem with the NIC.

In one embodiment of the present invention, the diagnostic system can create the filter or can modify the filter based on: historical analysis; statistical analysis; user specified negligible differences; or any other basis for creating or modifying a filter to filter out negligible or nominal differences in responses.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, computing environment 100 includes: client 110, suspect client 120, client 130, client 140, network 150, database 160, server 170, and diagnostic system 175.

Client 110, suspect client 120, client 130, and client 140 can generally include any node on a network including computational capability and including a mechanism for communicating across the network.

In one embodiment of the present invention, suspect client 120 is suspected of operating abnormally. This suspicion may be based on: hardware activity, software activity, network activity, or any other activity or lack of activity that may indicate suspect behavior.

We assume that clients 110, 130, and 140 are operating normally (they are operating as specified by a manufacturer or a user).

Network 150 can generally include any type of wired or wireless communication channel capable of coupling together computing nodes. This includes, but is not limited to, a local area network, a wide area network, or a combination of networks. In one embodiment of the present invention, network 150 comprises the Internet.

Database 160 can generally include any type of system for storing data in non-volatile storage. This includes, but is not limited to, systems based upon magnetic, optical, and magneto-optical storage devices, as well as storage devices based on flash memory and/or battery-backed up memory.

Server 170 can generally include any computational node including a mechanism for servicing requests from a client for computational and/or data storage resources.

Diagnostic system 175 can generally include any system for evaluating and troubleshooting a client or a computing system. In one embodiment of the present invention, server 170 hosts diagnostic system 175.

In one embodiment of the present invention, diagnostic system 175 is a stand-alone system.

In one embodiment of the present invention, diagnostic system 175 can be implemented in hardware, in software, or in a combination of hardware and software.

In one embodiment of the present invention, user 112 can use client 110 to access diagnostic system 175 over network 150.

In one embodiment of the present invention, user 112 directly accesses diagnostic system 175 (in the embodiment where diagnostic system 175 is a stand-alone system), or by accessing server 170, wherein server 170 hosts diagnostic system 175.

In other embodiments of the present invention, clients 110, 130, 140, or suspect client 120 can host diagnostic system 175.

Diagnostic System

Figure 2:
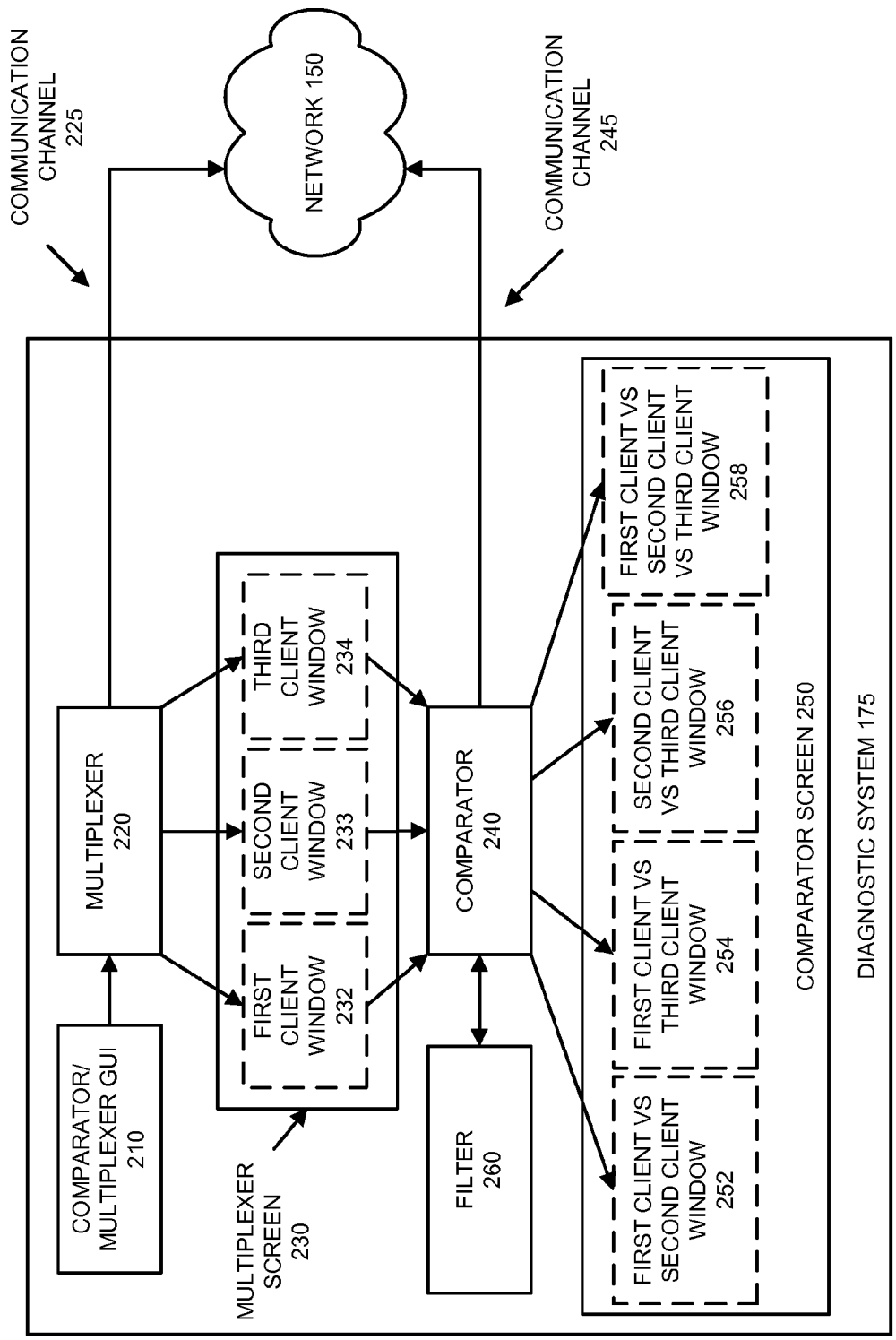
FIG. 2 illustrates a diagnostic system in accordance with an embodiment of the present invention.

FIG. 2 illustrates diagnostic system 175 in accordance with an embodiment of the present invention. Note that diagnostic system 175 can be: a hardware system, a software system, or a system implemented using a combination of hardware and software. Furthermore, note that diagnostic system 175 can be a stand-alone system. Alternatively, a networked system, such as server 170, can host diagnostic system 175. Diagnostic system 175 can include a number of components including: comparator/multiplexer graphical user interface (GUI) 210, multiplexer 220, multiplexer screen 230, comparator 240, comparator screen 250, and filter 260. Note that each of these components can be part of diagnostic system 175, or they can be stand-alone components that are associated with diagnostic system 175.

Comparator/multiplexer GUI 210 can generally include any GUI that accepts input or commands from a client or a user. Furthermore, comparator/multiplexer GUI 210 can include any user interface that accepts commands from a user including graphical and non-graphical user interfaces. For example, comparator/multiplexer GUI 210 can include a command-line interface or a voice-interface.

Multiplexer 220 can generally include any system for receiving commands from comparator/multiplexer GUI 210, and then sending (via communication channel 225) the commands simultaneously (or in parallel) to multiple clients. Furthermore, multiplexer 220 can display the commands on multiplexer screen 230. Note that multiplexer 220 can also send the commands to a single client.

In one embodiment of the present invention, multiplexer 220 can send the commands serially to multiple clients.

In one embodiment of the present invention, multiplexer 220 modifies the commands before sending the commands to the multiple clients and to multiplexer screen 230. These modifications can include any changes that enable the multiple clients to successfully execute the commands. Furthermore, the modifications may be different for each client. For example, multiplexer 220 may change an Internet Protocol (IP) address included with a command to match the IP address associated with a client receiving the command. In a second example, multiplexer 220 may modify a command to account for different operating system versions that each client is running.

Multiplexer screen 230 can generally include any display system for displaying commands received from multiplexer 220. In one embodiment of the present invention, multiplexer screen 230 can include a display for each client receiving commands from multiplexer 220. For example, multiplexer screen 230 can include: first client window 232, which displays commands sent to suspect client 120; second client window 233, which displays commands sent to client 130; and third client window 234, which sends commands sent to client 140.

Comparator 240 can generally include any system for receiving (via communication channel 245) command-responses from multiple clients, and then comparing these command-responses to determine functional differences between the multiple clients. Furthermore, comparator 140 can receive from comparator/multiplexer GUI 210, multiplexer 220, or multiplexer screen 230 the commands that initiated the command-responses.

Comparator screen 250 can generally include any display system for displaying differences between command-responses received from multiple clients. Furthermore, comparator screen 250 can also display the command-responses. More specifically, comparator screen 250 can include a display for each permutation of comparisons between the multiple clients. For example, comparator screen 250 can include: first client versus second client window 252, which can display differences between suspect client 120's command-responses and client 130's command-responses; first client versus third client window 254, which can display differences between suspect client 120's command-responses and client 140's command-responses; second client versus third client window 256, which can display differences between client 130's command-responses and client 140's command-responses; and first client versus second client versus third client window 258, which can display differences between suspect client 120's command-responses, client 130's command-responses, and client 140's command-responses.

In one embodiment of the present invention, comparator screen 250 can include a display for each client which sends a command-response to comparator 240. This display can include the command sent to each client and/or the command-response received from each client.

In one embodiment of the present invention, multiplexer screen 230 and comparator screen 250 can be a single screen.

In one embodiment of the present invention, multiplexer 220 and comparator 240 can be: located on the same hardware device, the same software component, or the same combination of hardware device and software component.

Filter 260 can generally include any filter for filtering command-responses and/or identified differences between the command-responses to remove nominal differences, negligible differences, or any other information that a client or user desires to remove. Note that nominal differences are differences that can exist between clients during normal operation, such as differences in client names or network activity, and thus, may or may not be useful in identifying abnormal behavior. Negligible differences are differences that exist between clients which do not facilitate identifying abnormal behavior between clients, such as differences in client names. Note that negligible differences can be a subset of nominal differences.

Troubleshooting a Computer System

Figure 3:
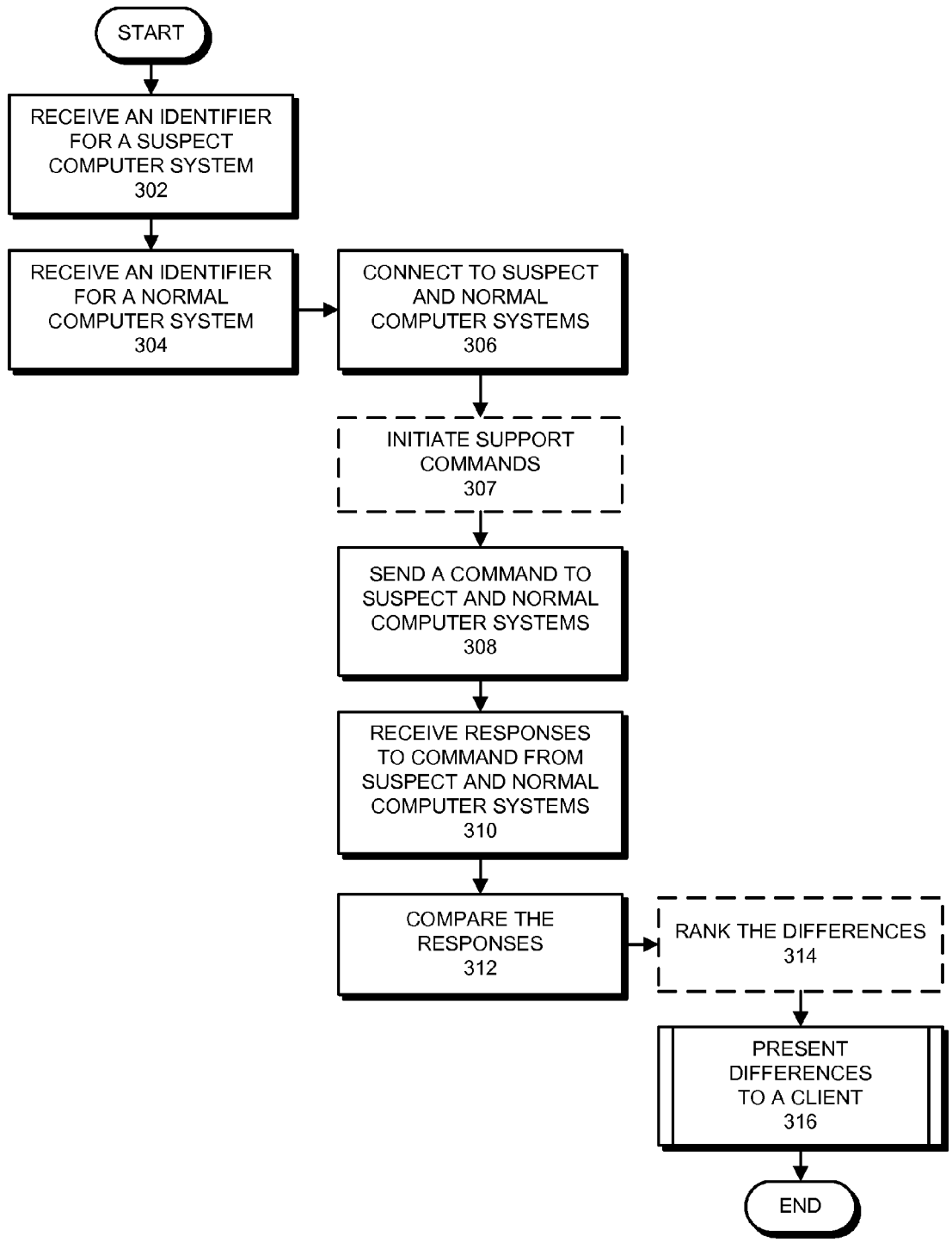
FIG. 3 presents a flowchart illustrating the process of troubleshooting a computer system in accordance with an embodiment of the present invention.

FIG. 3 presents a flowchart illustrating the process of troubleshooting a computer system in accordance with an embodiment of the present invention. The process begins when diagnostic system 175 receives an identifier for a "suspect" computer system, such as suspect client 120, from user 112 (operation 302). Note that a "suspect" computer system is a computer system that user 112 suspects of behaving abnormally. Diagnostic system 175 can also receive an identifier for a "normal" computer system, such as client 130 (operation 304).

In one embodiment of the present invention, diagnostic system 175 receives identifiers for multiple computer systems from user 112. These multiple computer systems can include both "normal" computer systems and "suspect" computer systems.

In one embodiment of the present invention, diagnostic system 175 can receive the identifiers for suspect client 120 and for client 130 from a client, a server, or a database. For example, diagnostic system 175 can receive the identifier from client 110.

Next, diagnostic system 175 connects to suspect client 120 and to client 130 (operation 306). Note that connecting to suspect client 120 and client 130 may involve authenticating user 112 or client 110, or any other supplementary process required to establish a connection with suspect client 120 and with client 130.

Then, diagnostic system 175 can initiate support commands (operation 307). These support commands facilitate: executing subsequent commands; monitoring the results of the subsequent commands; recording system behavior in response to subsequent commands; and any other process that can assist in diagnosing suspect client 120, or in comparing suspect client 120 to client 130. Note that operation 307 is optional as indicated by the dashed lines surrounding operation 307.

Diagnostic system 175 then sends a command to suspect client 120 and to client 130 (operation 308) to cause suspect client 120 and client 130 to execute the command. Note that diagnostic system 175 can obtain the command from user 112, database 160, server 170, or any other source of commands. Furthermore, note that diagnostic system 175 can send the same command to both suspect client 120 and to client 130.

In one embodiment of the present invention, diagnostic system 175 may send the command simultaneously or serially to suspect client 120 and to client 130. In this embodiment, diagnostic system 175 obtains the command only once from client 110, user 112, or database 160, but can send the command to any number of clients.

In one embodiment of the present invention, diagnostic system 175 sends a plurality of commands to suspect client 120 and to client 130.

In one embodiment of the present invention, diagnostic system 175 modifies the command before sending the command to suspect client 120 and to client 130. This may involve making modifications to the command to facilitate identical execution of the command on suspect client 120 and on client 130. Furthermore, this may involve diagnostic system 175 modifying the command differently for suspect client 120 and for client 130. Thus, in this embodiment, diagnostic system 175 may send different, but related, commands to suspect client 120 and to client 130. For example, diagnostic system 175 may modify the command to include an IP address associated with suspect client 120 when diagnostic system 175 sends the command to suspect client 120. Diagnostic system 175 may similarly modify the command to include an IP address associated with client 130 when sending the command to client 130.

Next, diagnostic system 175 receives responses to the command from suspect client 120 and from client 130 (operation 310). Then, diagnostic system 175 compares the responses that diagnostic system 175 received from suspect client 120 and from client 130 to determine if any differences exist between the responses (operation 312).

In one embodiment of the present invention, the differences in responses can be associated with: a hardware malfunction; an operating system malfunction; an application malfunction; or a configuration error. The differences can also be nominal differences which exist between computer systems during normal operation, such as differences in computer names or levels of network activity associated with suspect client 120 and client 130.

In one embodiment of the present invention, user 112 can specify that a nominal difference is a negligible difference, which causes diagnostic system 175 to filter out the nominal differences. This is described in further detail with reference to FIG. 4 and FIG. 5.

In one embodiment of the present invention, comparing the responses to the command can involve comparing meta-data related to the responses. For example, diagnostic system 175 can compare the amount of time elapsed from when the command was sent to suspect client 120 and to client 130 to when the responses to the command were received from suspect client 120 and from client 130.

Diagnostic system 175 then ranks the differences between the response received from suspect client 120 and the response received from client 130 (operation 314). Note that diagnostic system 175 can rank the differences based on: the severity of the difference, the size of the difference, the probability that the difference is attributed to the abnormal behavior of suspect client 120, or any other ranking order that can help diagnostic system 175, client 110, or user 112 to analyze the differences. Furthermore, note that operation 314 is optional as indicated by the dashed lines surrounding operation 314.

Next, diagnostic system 175 presents the differences in the responses from suspect client 120 and from client 130 to client 110 or user 112 (operation 316). This operation is a multi-step process which is described in more detail with reference to FIG. 4.

In one embodiment of the present invention, diagnostic system 175 presents to user 112 the responses to the command, and the differences in the responses to the command.

In one embodiment of the present invention, diagnostic system 175 presents only the responses to the command to user 112.

In one embodiment of the present invention, diagnostic system 175 can perform the process described with reference to FIG. 3 for multiple computer systems. For example, diagnostic system 175 can receive identifiers for multiple computer systems from user 112. These multiple computer systems can include both "normal" computer systems and "suspect" computer systems, such as suspect client 120, client 130, and client 140. Diagnostic system 175 can then connect to suspect client 120, client 130, and client 140. Next, diagnostic system 175 can send a command to suspect client 120, client 130, and client 140. Then, diagnostic system 175 can receive a response to the command from suspect client 120, client 130, and client 140. Diagnostic system 175 can then compare the responses and can determine differences in the responses. Finally, diagnostic system 175 can present the differences to user 112.

Filtering Responses to a Command

Figure 4:
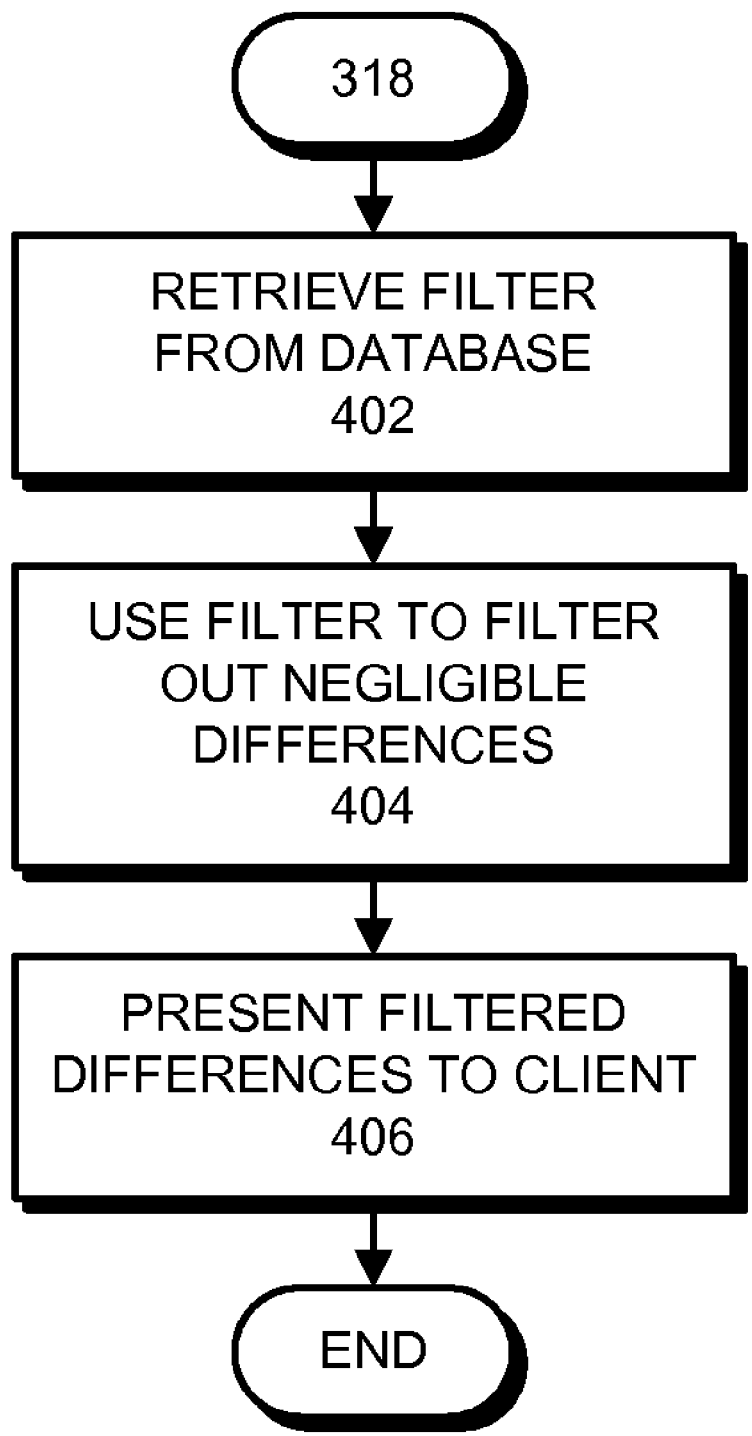
FIG. 4 presents a flowchart illustrating the process of filtering responses to a command in accordance with an embodiment of the present invention.

FIG. 4 presents a flowchart illustrating the process of filtering responses to a command in accordance with an embodiment of the present invention. The process begins when diagnostic system 175 retrieves a filter from database 160 (operation 402). Note that diagnostic system 175 can also retrieve the filter from internal memory, server 170, client 110, or any other system capable of storing the filter.

Diagnostic system 175 then uses this filter to filter out negligible differences (operation 404) between responses received from suspect client 120 and from client 130 relating to a command that suspect client 120 and client 130 received from diagnostic system 175. These negligible differences are differences which do not facilitate identifying abnormal behavior. Then, diagnostic system 175 presents the filtered differences to client 110 or user 112 (operation 406).

In one embodiment of the present invention, diagnostic system 175 uses the filter to filter out differences which could be associated with abnormal behavior of suspect client 120. In this embodiment, diagnostic system 175 can filter out differences which are not likely to be related to the abnormal behavior of suspect client 120, or which are likely to be related to side-effects of the abnormal behavior.

In one embodiment of the present invention, diagnostic system 175 invokes processes on suspect client 120 and client 130 which can filter out responses to commands or any other data which does not facilitate identifying abnormal behavior. These processes can perform the filtering process prior to sending the responses to commands (and any additional data for identifying abnormal behavior) to diagnostic system 175.

Creating a Filter

Figure 5:
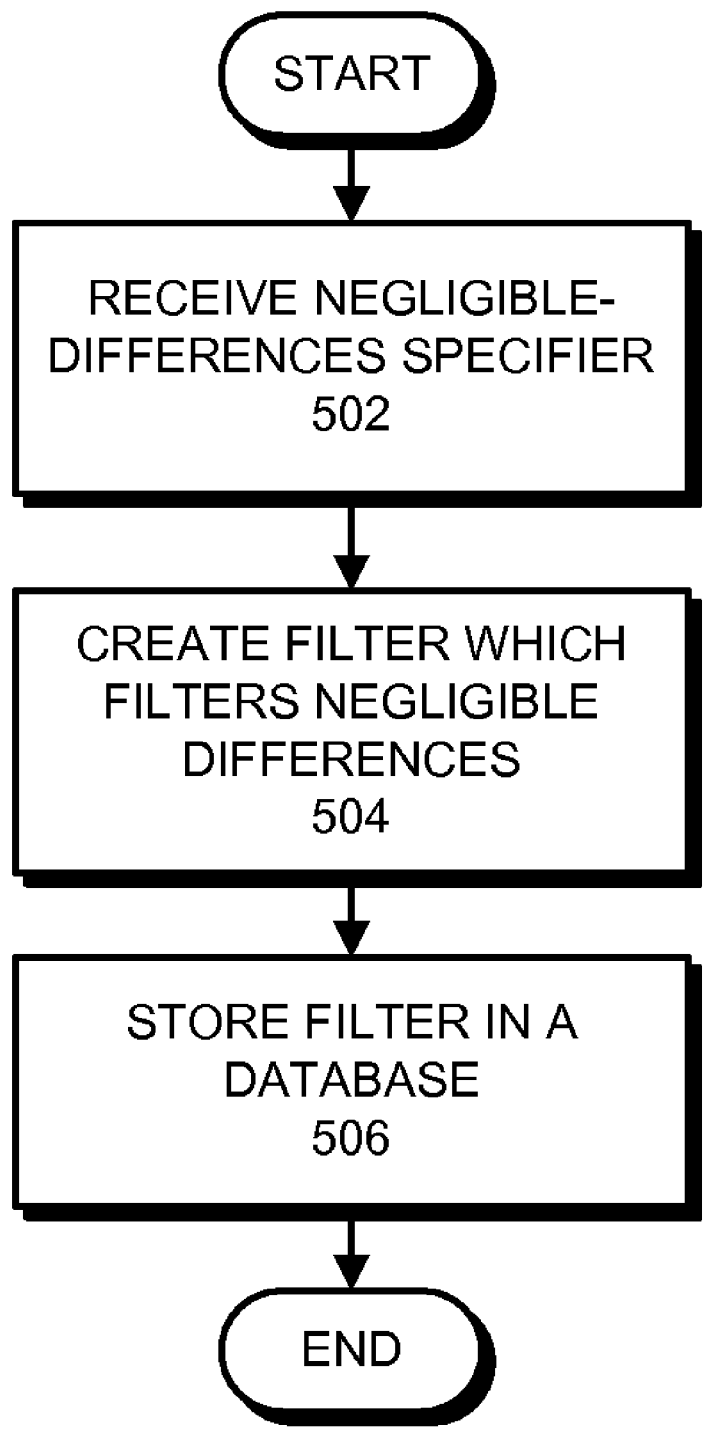
FIG. 5 presents a flowchart illustrating the process of creating a filter in accordance with an embodiment of the present invention.

FIG. 5 presents a flowchart illustrating the process of creating a filter in accordance with an embodiment of the present invention. This process begins when diagnostic system 175 receives from client 110 or user 112 a negligible-differences specifier (operation 502), which identifies specific negligible differences that can exist between responses to commands from computer systems when the computer systems are behaving normally.

Next, diagnostic system 175 creates a filter which can filter out these specific negligible differences (operation 504) from a comparison of the responses to the commands. Diagnostic system 175 creates this filter based on the negligible differences identified by the negligible-differences specifier. Then, diagnostic system 175 stores the filter in database 160 (operation 506).

In one embodiment of the present invention, diagnostic system 175 can store the filter on server 170 or any other storage medium capable of storing a filter.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for troubleshooting a computer system, the method comprising:
 receiving an identifier for a suspect computer system, which is suspected of operating abnormally;
 receiving an identifier for a normal computer system, which is operating normally;
 automatically sending a command to be executed to both the suspect computer system and the normal computer system, wherein automatically sending the command involves determining if the command is to be modified to enable the command to execute on both computer systems and, if so, before sending the command to the suspect computer system and the normal computer system, modifying the command to match a command-format associated with each computer system;
 recording system behavior for the suspect computer system and the normal computer system in response to the command;
 receiving responses to the command and the recorded system behaviors from both the suspect computer system and the normal computer system; and
 comparing the received responses and the recorded system behaviors to determine differences between a behavior of the suspect computer system and a behavior of the normal computer system.

2. The method of claim 1, further comprising:
 receiving an identifier for an additional normal computer system;
 sending the command to the additional normal computer system to cause the additional normal computer system to execute the command;
 receiving a response to the command from the additional normal computer system; and
 comparing the responses from the suspect computer system, the normal computer system, and the additional normal computer system to determine differences between the behavior of the suspect computer system, the normal computer system, and the additional normal computer system.

3. The method of claim 1, wherein the command includes a plurality of commands.

4. The method of claim 1, wherein the command is received from a client.

5. The method of claim 1, wherein, prior to presenting the differences to the client, the method further comprises:
 retrieving a filter from a database; and
 using the filter to filter out negligible differences between the responses, wherein the negligible differences are differences which do not facilitate identifying abnormal behavior associated with the suspect computer system.

6. The method of claim 1, wherein comparing the responses involves ranking the differences between the responses based on the probability that a specific difference caused the suspect computer system to function abnormally.

7. The method of claim 1, wherein the differences can be associated with:
 a hardware malfunction;
 an operating system malfunction;
 an application malfunction; and
 a configuration error.

8. The method of claim 1, wherein after presenting the differences to the client, the method further comprises:
 receiving from the client a negligible-differences specifier, which specifies negligible differences that exist between responses from computer systems when the computer systems are operating normally;

creating a filter which filters out the negligible differences; and storing the filter in a database.

9. The method of claim 1, wherein modifying the command to match the command-format associated with each computer system comprises modifying a format of the command to enable the command to execute using a different operating system that is running on each computer system.

10. A computer-readable storage medium storing instructions that when executed by a computer cause the computer to perform a method for troubleshooting a computer system, the method comprising:

receiving an identifier for a suspect computer system, which is suspected of operating abnormally;

receiving an identifier for a normal computer system, which is operating normally;

automatically sending a command to be executed to both the suspect computer system and the normal computer system, wherein automatically sending the command involves determining if the command is to be modified to enable the command to execute on both computer systems and, if so, before sending the command to the suspect computer system and the normal computer system, modifying the command to match a command-format associated with each computer system;

recording system behavior for the suspect computer system and the normal computer system in response to the command;

receiving responses to the command and the recorded system behaviors from both the suspect computer system and the normal computer system; and comparing the received responses and the recorded system behaviors to determine differences between a behavior of the suspect computer system and a behavior of the normal computer system.

11. The computer-readable storage medium of claim 10, wherein the method further comprises:

receiving an identifier for an additional normal computer system;

sending the command to the additional normal computer system to cause the additional normal computer system to execute the command;

receiving a response to the command from the additional normal computer system; and comparing the responses from the suspect computer system, the normal computer system, and the additional normal computer system to determine differences between the behavior of the suspect computer system, the normal computer system, and the additional normal computer system.

12. The computer-readable storage medium of claim 10, wherein the command includes a plurality of commands.

13. The computer-readable storage medium of claim 10, wherein the command is received from a client.

14. The computer-readable storage medium of claim 10, wherein, prior to presenting the differences to the client, the method further comprises:

retrieving a filter from a database; and using the filter to filter out negligible differences between the responses, wherein the negligible differences are differences which do not facilitate identifying abnormal behavior associated with the suspect computer system.

15. The computer-readable storage medium of claim 10, wherein comparing the responses involves ranking the differences between the responses based on the probability that a specific difference caused the suspect computer system to function abnormally.

16. The computer-readable storage medium of claim 10, wherein after presenting the differences to the client, the method further comprises:

receiving from the client a negligible-differences specifier, which specifies negligible differences that exist between responses from computer systems when the computer systems are operating normally;

creating a filter which filters out the negligible differences; and storing the filter in a database.

17. An apparatus that troubleshoots a computer system, comprising:

a processor;

a receiving mechanism configured to receive an identifier for a suspect computer system, which is suspected of operating abnormally;

wherein the receiving mechanism is further configured to receive an identifier for a normal computer system, which is operating normally;

a sending mechanism configured to automatically send a command to be executed to both the suspect computer system and the normal computer system, wherein automatically sending the command involves determining if the command is to be modified to enable the command to execute on both computer systems and, if so, before sending the command to the suspect computer system and the normal computer system, modifying the command to match a command-format associated with each computer system;

a recording mechanism configured to record system behavior for the suspect computer system and the normal computer system in response to the command;

wherein the receiving mechanism is further configured to receive responses to the command and the recorded system behaviors from both the suspect computer system and the normal computer system; and a comparison mechanism configured to compare the received responses and the recorded system behaviors to determine differences between a behavior of the suspect computer system and a behavior of the normal computer system.

18. The apparatus of claim 17, further comprising:

the receiving mechanism further configured to receive an identifier for an additional normal computer system;

the sending mechanism further configured to send the command to the additional normal computer system to cause the additional normal computer system to execute the command;

the receiving mechanism further configured to receive a response to the command from the additional normal computer system; and the comparison mechanism further configured to compare the responses from the suspect computer system, the normal computer system, and the additional normal computer system to determine differences between the behavior of the suspect computer system, the normal computer system, and the additional normal computer system.

19. The apparatus of claim 17, further comprising:

a retrieval mechanism configured to retrieve a filter from a database; and a filtering mechanism configured to use the filter to filter out negligible differences between the responses, wherein the negligible differences are differences which do not facilitate identifying abnormal behavior associated with the suspect computer system.

20. The apparatus of claim 17, further comprising a ranking mechanism configured to rank the differences between the responses based on the probability that a specific difference caused the suspect computer system to function abnormally.

21. The apparatus of claim 17, wherein the receiving mechanism is further configured to receive from the client a negligible-differences specifier, which specifies negligible differences that exist between responses from computer systems when the computer systems are operating normally; and wherein the apparatus further comprises:

a creation mechanism configured to create a filter which filters out the negligible differences; and a storage mechanism configured to store the filter in a database.

* * * * *